US009129283B1

(12) United States Patent
Raju

(10) Patent No.: US 9,129,283 B1
(45) Date of Patent: Sep. 8, 2015

(54) ACCESSING CONFIDENTIAL DATA SECURELY USING A TRUSTED NETWORK OF MOBILE DEVICES

(75) Inventor: Hemant Raju, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 706 days.

(21) Appl. No.: 13/347,560

(22) Filed: Jan. 10, 2012

(51) Int. Cl.
G06F 21/00 (2013.01)
G06Q 20/38 (2012.01)

(52) U.S. Cl.
CPC ................... G06Q 20/3829 (2013.01)

(58) Field of Classification Search
USPC .............................. 709/214; 463/16
See application file for complete search history.

(56) References Cited

U.S. PATENT DOCUMENTS

| 4,658,093 | A * | 4/1987 | Hellman | 705/52 |
| 5,181,107 | A * | 1/1993 | Rhoades | 725/105 |
| 5,630,204 | A * | 5/1997 | Hylton et al. | 725/116 |
| 5,654,746 | A * | 8/1997 | McMullan et al. | 725/29 |
| 5,677,905 | A * | 10/1997 | Bigham et al. | 370/395.21 |
| 5,734,589 | A * | 3/1998 | Kostreski et al. | 715/716 |
| 6,253,193 | B1 * | 6/2001 | Ginter et al. | 705/57 |
| 6,263,313 | B1 * | 7/2001 | Milsted et al. | 705/50 |
| 6,327,652 | B1 * | 12/2001 | England et al. | 713/2 |
| 6,363,149 | B1 * | 3/2002 | Candelore | 380/45 |
| 6,363,357 | B1 * | 3/2002 | Rosenberg et al. | 705/51 |
| 6,418,421 | B1 * | 7/2002 | Hurtado et al. | 705/54 |
| 6,574,609 | B1 * | 6/2003 | Downs et al. | 705/50 |
| 6,599,194 | B1 * | 7/2003 | Smith et al. | 463/30 |
| 6,697,489 | B1 * | 2/2004 | Candelore | 380/200 |
| 6,769,989 | B2 * | 8/2004 | Smith et al. | 463/41 |
| 6,820,063 | B1 * | 11/2004 | England et al. | 705/54 |
| 6,834,110 | B1 * | 12/2004 | Marconcini et al. | 380/239 |
| 6,871,188 | B2 * | 3/2005 | De Souza | 705/26.8 |
| 6,978,022 | B2 * | 12/2005 | Okimoto et al. | 380/211 |
| 7,080,397 | B2 * | 7/2006 | Cochran et al. | 725/87 |
| 7,233,948 | B1 * | 6/2007 | Shamoon et al. | 1/1 |
| 7,865,567 | B1 * | 1/2011 | Hendricks et al. | 709/214 |
| 8,627,438 | B1 * | 1/2014 | Bhimanaik | 726/9 |
| 2001/0046299 | A1 * | 11/2001 | Wasilewski et al. | 380/282 |
| 2002/0044658 | A1 * | 4/2002 | Wasilewski et al. | 380/239 |
| 2004/0152504 | A1 * | 8/2004 | Herrmann et al. | 463/16 |
| 2010/0255787 | A1 * | 10/2010 | Wilson et al. | 455/67.11 |
| 2011/0313922 | A1 * | 12/2011 | Ben Ayed | 705/42 |

* cited by examiner

Primary Examiner — Dante Ravetti
(74) Attorney, Agent, or Firm — Osha Liang LLP

(57) ABSTRACT

A system including a managing device communicatively coupled to a keyholding device. The managing device includes a data manager executing on the processor configured to receive a request to decrypt encrypted data from a protected application and obtain the keyholding device identifier from a trusted device list. The data manager is further configured to send a connection request to the keyholding device using the keyholding device identifier and create an established connection in response to determining that the keyholding device has accepted the connection request. The data manager is further configured to request, via the established connection, the encryption key from a keyholding process executing on the keyholding device and obtain the encryption key from the keyholding process on keyholding device. The data manager is further configured to decrypt the encrypted data using encryption key to obtain decrypted data and send the decrypted data to the protected application.

14 Claims, 13 Drawing Sheets

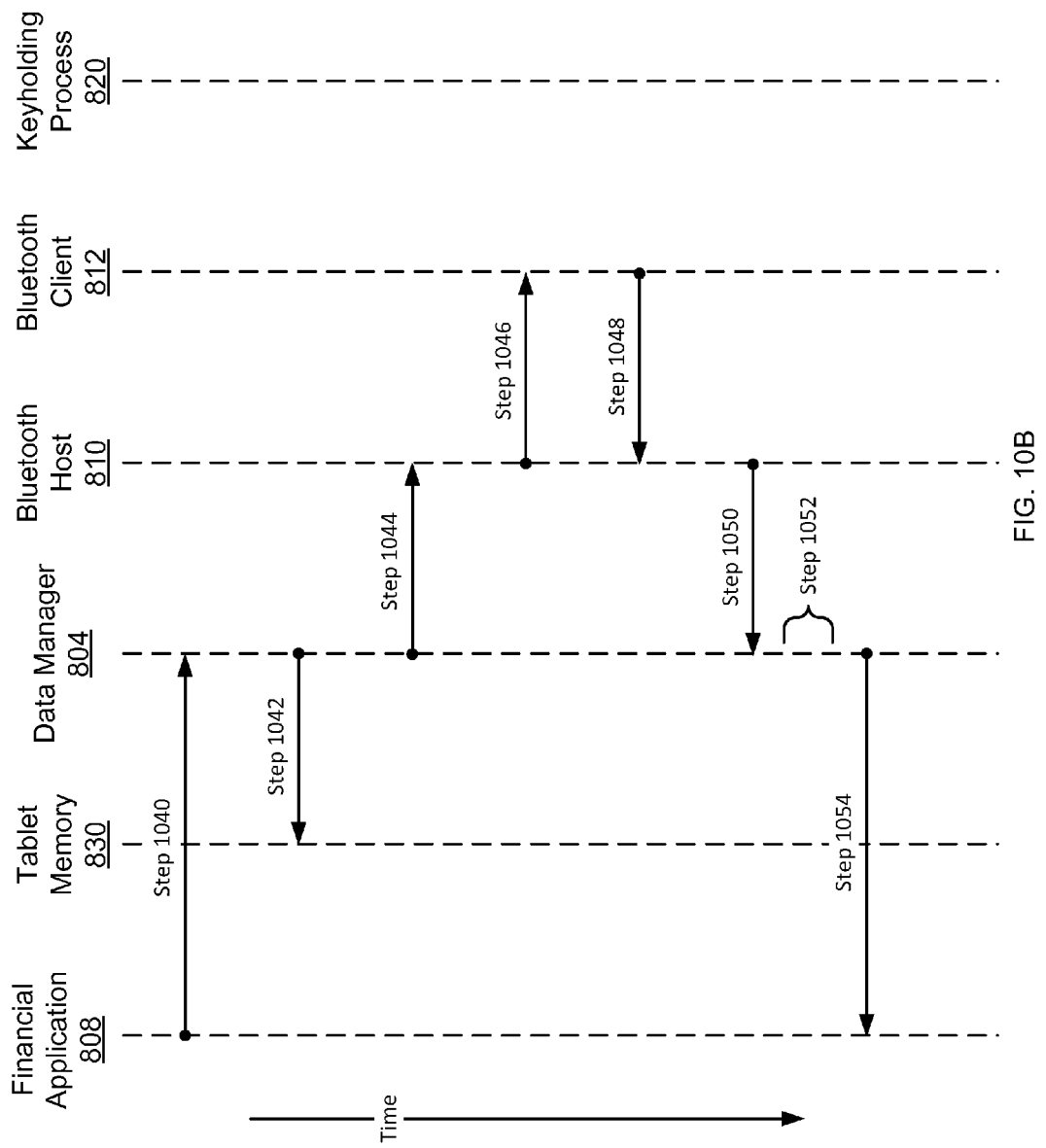

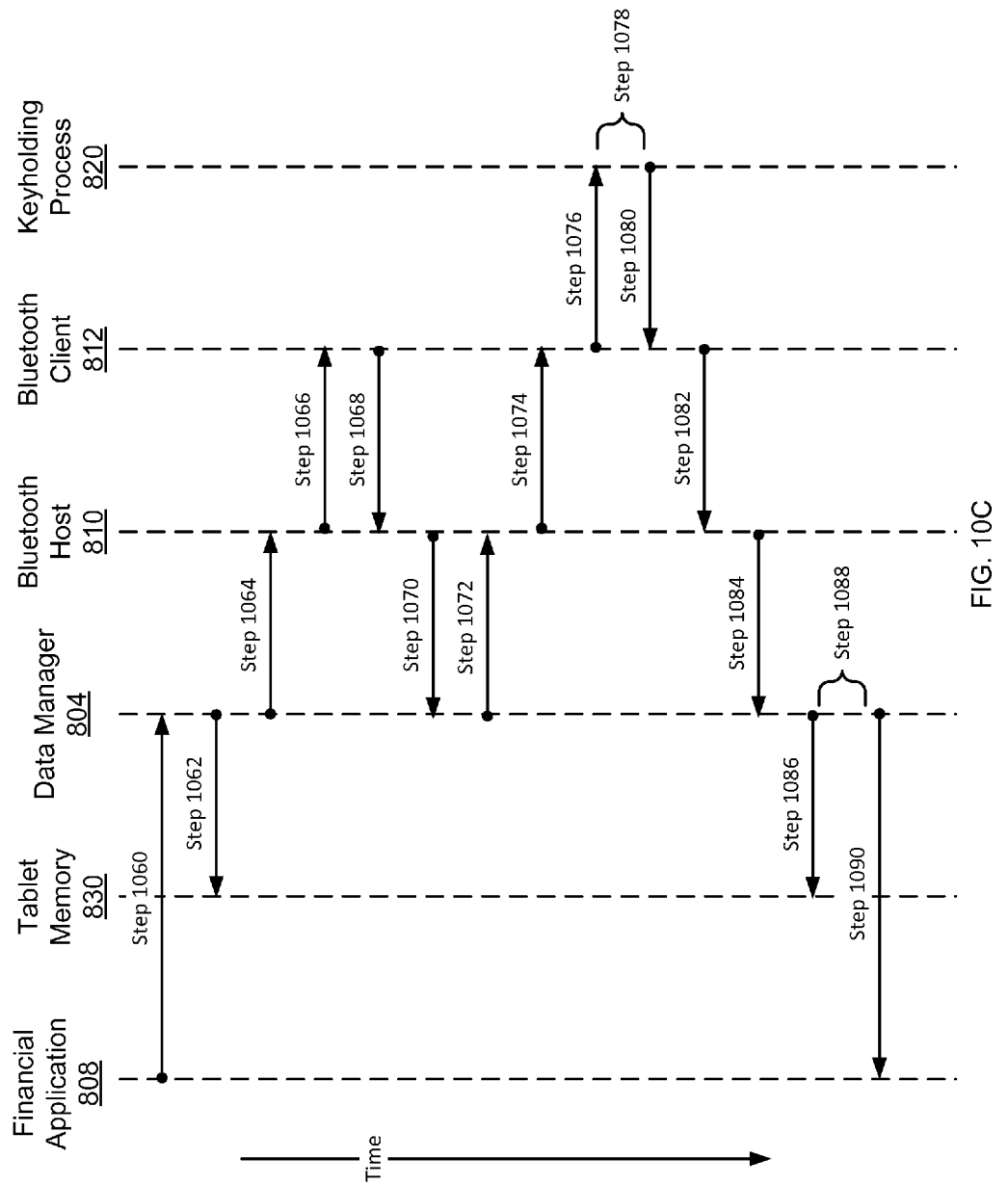

ACCESSING CONFIDENTIAL DATA SECURELY USING A TRUSTED NETWORK OF MOBILE DEVICES

BACKGROUND

Modern computer users rely on networked applications for both personal and business uses with increasing frequency. Many networked applications store sensitive information about the user or the user's clients. Networked applications frequently employ some form of authentication to ensure the entity accessing the user data is authorized to do so. Often, the authentication is accomplished by requiring the entity to provide data, such as a password, known only to authorized users. However, authorized users frequently forget the authenticating data, and in some cases resort to storing the data in an unsecured manner.

SUMMARY

In general, in one aspect, the invention relates to a system including a managing device communicatively coupled to a keyholding device. The managing device includes a processor, a protected application executing on the processor, a memory configured to store encrypted data encrypted using an encryption key, and a trusted device list comprising a keyholding device identifier identifying the keyholding device. The managing device also includes a data manager executing on the processor configured to receive a request to decrypt the encrypted data from the protected application and obtain the keyholding device identifier from the trusted device list. The data manager is further configured to send a connection request to the keyholding device using the keyholding device identifier and create an established connection in response to determining that the keyholding device has accepted the connection request. The data manager is further configured to request, via the established connection, the encryption key from a keyholding process executing on the keyholding device and obtain the encryption key from the keyholding process on keyholding device. The data manager is further configured to decrypt the encrypted data using encryption key to obtain decrypted data and send the decrypted data to the protected application.

In general, in one aspect, the invention relates to a method. The method includes receiving a request to decrypt encrypted data from a protected application, wherein the encrypted data is encrypted using an encryption key and obtaining, from a trusted device list, a keyholding device identifier identifying a keyholding device. The method further includes sending a connection request to the keyholding device using the keyholding device identifier and creating an established connection in response to determining that the keyholding device has accepted the connection request. The method further includes requesting, via the established connection, the encryption key from a keyholding process executing on the keyholding device and obtaining the encryption key from the keyholding process on keyholding device. The method further includes decrypting the encrypted data using encryption key to obtain decrypted data and sending the decrypted data to the protected application.

In general, in one aspect, the invention relates to a computer readable storage medium comprising instructions that, when executed by a processor, perform a method. The method includes receiving a request to decrypt encrypted data from a protected application, wherein the encrypted data is encrypted using an encryption key and obtaining, from a trusted device list, a keyholding device identifier identifying a keyholding device. The method further includes sending a connection request to the keyholding device using the keyholding device identifier and creating an established connection in response to determining that the keyholding device has accepted the connection request. The method further includes requesting, via the established connection, the encryption key from a keyholding process executing on the keyholding device and obtaining the encryption key from the keyholding process on keyholding device. The method further includes decrypting the encrypted data using encryption key to obtain decrypted data and sending the decrypted data to the protected application.

BRIEF DESCRIPTION OF DRAWINGS

FIG. 10A-10C show example timelines in accordance with one or more embodiments of the invention.

DETAILED DESCRIPTION

Figure 1:
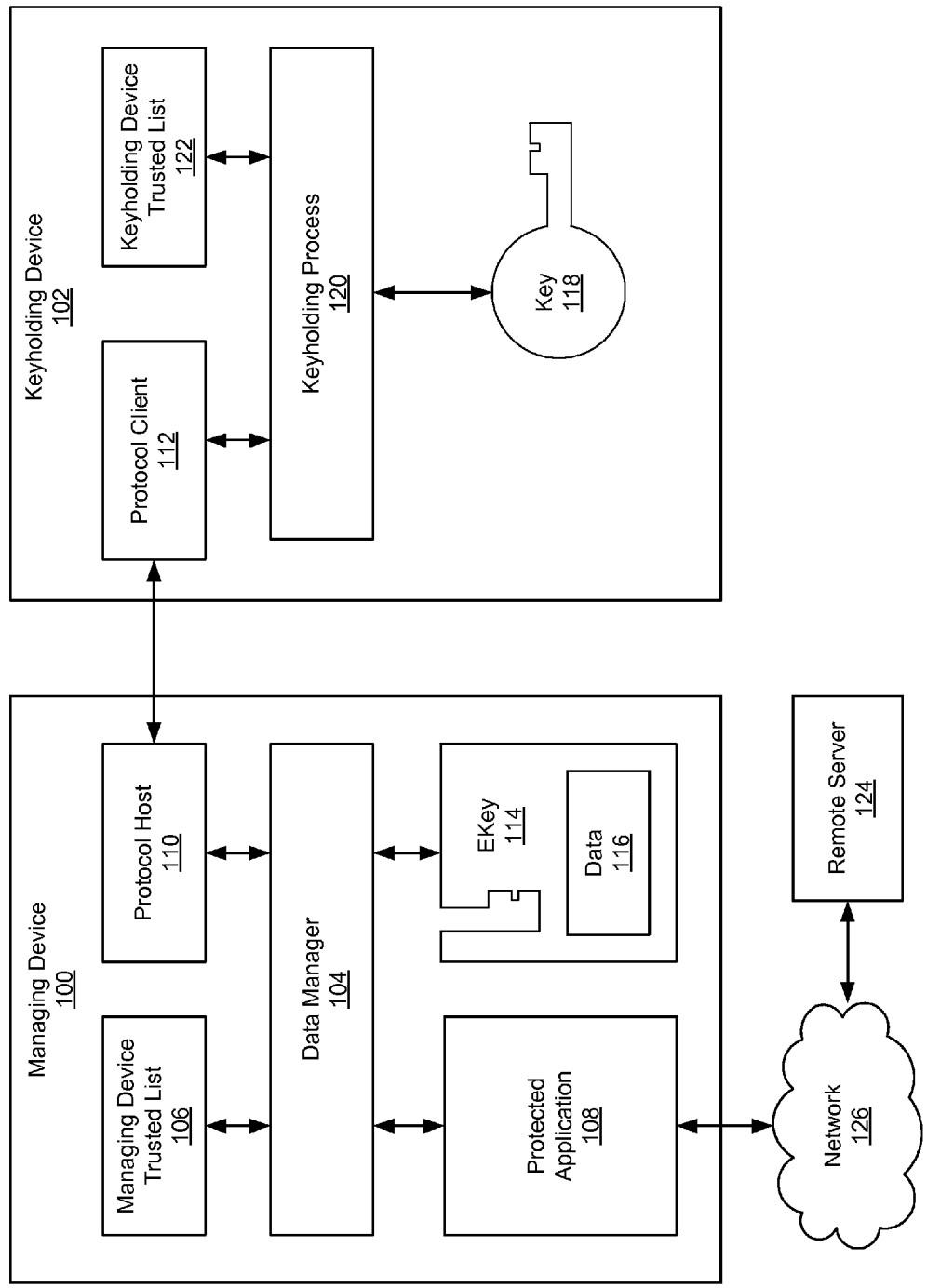
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for securely storing confidential data using multiple personal mobile devices. Specifically, embodiments of the invention may be used to store confidential data whose retrieval requires the physical proximity of at least two devices.

FIG. 1 shows a diagram of a system in accordance with one or more embodiments of the invention. As shown in FIG. 1, the system includes a managing device (100) and a keyholding device (102). The managing device (100) includes a data manager (104), managing device trusted list (106), a protected application (108), and a protocol host (110). The managing device (100) also includes an encrypted file (ekey) (114) which includes data (116) encrypted using an encryption key (key) (118). The keyholding device (102) includes the encryption key (118), a keyholding process (120), a protocol client (112), and a keyholding device trusted list (122). The protected application (108) accesses a remote server (124) over a network (126).

In one or more embodiments of the invention, the managing device (100) is any computer device used to execute the protected application (108). The managing device (100) may be a portable computing system such as a laptop computer, smartphone, tablet computer, or personal digital assistant. In one embodiment of the invention, the protected application (108) is a program designed to provide an interface between a user of the managing device (100) and the remote server (124). Examples of protected applications include investment applications, banking applications, messaging applications, and medical applications. A protected application (108) may be a program available on multiple mobile platforms in order to provide access to the remote server (124) from multiple types of devices.

In one or more embodiments of the invention, protected application (108) is protected from unauthorized access by an authentication mechanism. In one embodiment of the invention, the authorized users of the protected application (108) are authenticated by providing the data (116) to the protected application (108). In one or more embodiments of the invention, the data (116) is a password set by the user of the managing device. In one embodiment of the invention, the data (116) is a randomly generated password provided to the use to access the protected application (108). Examples of data (116) for use in embodiments of the present invention also include, but are not limited to, account numbers, authentication programs, or computer files.

In one or more embodiments of the invention, the data manager (104) is a software program configured to access the encrypted file (114), decrypt the encrypted file (114) using the key (118), and provide data to the protected application (108). In one embodiment of the invention, the data manager (104) is configured to request the key (118) from the keyholding process (120), receive the key (118) and store the key (118) in managing device memory (not shown). The data manager (104) may also be configured to receive a keyholding device identifier (ID) (not shown) from the keyholding device (102) and store the keyholding device ID in the managing device trusted list (106).

In one or more embodiments of the invention, the keyholding process (120) is a software program configured to receive an encryption key (118), store the encryption key (118) in the keyholding device memory (not shown), and provide the key (118) to a managing device with whom a proper connection has been established. In one or more embodiments of the invention, the keyholding process is an instance of the data manager executing on the keyholding device and configured to interact with other data managers as a keyholding process.

In one or more embodiments of the invention, the data manager (104) communicates with the keyholding process (120) using the protocol host (110). In one embodiment of the invention, the protocol host (110) is a hardware and software combination for establishing a connection to the keyholding device (102). The protocol host (110) may correspond to wireless interface such as Bluetooth® (Bluetooth is a registered trademark of Bluetooth SIG, Inc.), infrared signal, wireless universal serial bus (USB) port, and IEEE 802.11.

In one embodiment of the invention, the protocol host (110) and protocol client (112) require physical proximity in order to establish a connection. The required physical proximity is referred to herein as the protocol proximity requirement. The protocol proximity requirement may vary depending on the implemented protocol. In one embodiment of the invention, when the protocol host (110) and protocol client (112) are separated by a physical distance exceeding the requirement, the protocol host (110) and protocol client will not establish a connection. For example, the protocol proximity requirement in one protocol may require that protocol host (110) and protocol client (112) be within 30 feet of one another. The protocol proximity requirement in another protocol may require that protocol host (110) and protocol client (112) be within 10 feet of one another. Further, the protocol proximity requirement may be different depending upon the presence of interfering signals between the protocol host (110) and the protocol client (112). For example, the protocol proximity requirement necessary to establish a connection between a protocol host (110) and a protocol client (112) may be 30 feet in optimal conditions, and 5 feet in the presence of signal interference.

In one or more embodiments of the invention, the data manager (104) and keyholding process (120) also have a signal strength policy specifying a minimum protocol signal strength in order to establish a connection. In one embodiment of the invention, the signal strength policy of the data manager (104) or the keyholding process (120) requires a stronger protocol signal between the managing device (100) and the keyholding device than is required to establish a connection between the protocol host (110) and the protocol client (112). For example, the protocol proximity requirement in a given situation to establish a Bluetooth connection between a managing device (100) and a keyholding device (102) may be 20 feet, but the signal strength policy of the data manager (104) or the keyholding process (120) requires a protocol signal that exists only at a distance of less than 10 feet. In this situation, if the signal strength policy is not satisfied, then either the data manager (104) or the keyholding process (120) will refuse to communicate with the corresponding device. In one embodiment of the invention, the signal strength policy is equal to that of the protocol proximity requirement.

In one or more embodiments of the invention, the data manager (104) is configured with a retry policy. A retry policy dictates the frequency and amount of retry attempts the data manager (104) makes in order to establish a connection to, or receive an encryption key (118) from, a keyholding device (102). For example, a retry policy may dictate that the data manager (104) tries to establish a connection every 20 seconds, and stops attempting after 5 tries. In one or more embodiments of the invention, the data manager (104) is also configured with a security policy dictating when an encryption key (118) is removed from the managing device memory. The security policy may be in terms of a session between a user and the protected application. The security policy may be in terms of a triggering event, such as the expiration of a period of time, or the detected end of a session.

In one or more embodiments of the invention, the protocol host (110) establishes a connection with the keyholding device (102) via the protocol client (112). In one embodiment of the invention, protocol client (112) is the hardware and software combination for communicating with the managing device (100) via the protocol host (110). In one embodiment of the invention, the protocol host (110) and protocol client (112) interact to establish a connection according to the protocol implemented by the protocol host (110) and protocol client (112) combination.

In one or more embodiments of the invention, managing device trusted list (106) is a list of keyholding device IDs corresponding to keyholding devices (such as keyholding device (102)) on which the data manager (104) has previously stored a key (such as key (118)). In one embodiment of the invention, the keyholding device IDs in the managing device trusted list (106) correspond to keyholding devices (such as keyholding device (102)) on which a key (such as key (118)) has been stored by an entity other than the data manager (104). Examples of keyholding device IDs stored on a managing device trusted list (106) are Bluetooth MAC (media access control) addresses and device serial numbers.

In one or more embodiments of the invention, keyholding device trusted list (122) is a list of managing device IDs (not shown) corresponding to managing devices (such as managing device (100)) from which the keyholding process (120) has previously received a key (such as key (118)). In one embodiment of the invention, the key (118) on the keyholding device is stored on the keyholding device (102) by an entity other than the managing device (100). In such cases, the managing device IDs in the keyholding device trusted list (122) correspond to managing devices (such as managing device (100)) to which a key (such as key (118)) may be provided. Examples of keyholding device IDs stored on a keyholding device trusted list (122) are Bluetooth MAC addresses and device serial numbers.

In one or more embodiments of the invention, the data (116) in the ekey (114) is unreadable without the key (118). In one embodiment of the invention, the ekey (114) is the resulting encrypted file generated by applying a method of encryption to data (116). Methods of encrypting data (116) include symmetric key (e.g., data encryption standard (DES), advanced encryption standard (AES)) and public key encryption (e.g., RSA encryption, developed by and named for Ron Rivest, Adi Shamir and Leonard Adleman). For example, an ekey (114) encrypted using a symmetric key is decrypted using the same symmetric key. Alternatively, an ekey (114) encrypted using a public key is decrypted using a corresponding private key. In one or more embodiments of the invention, the data manager sends the public key and the managing device's Bluetooth MAC address to each device that a user adds to the managing device trusted list (108). The private key is not sent out, but rather stored on the managing device.

Figure 2:
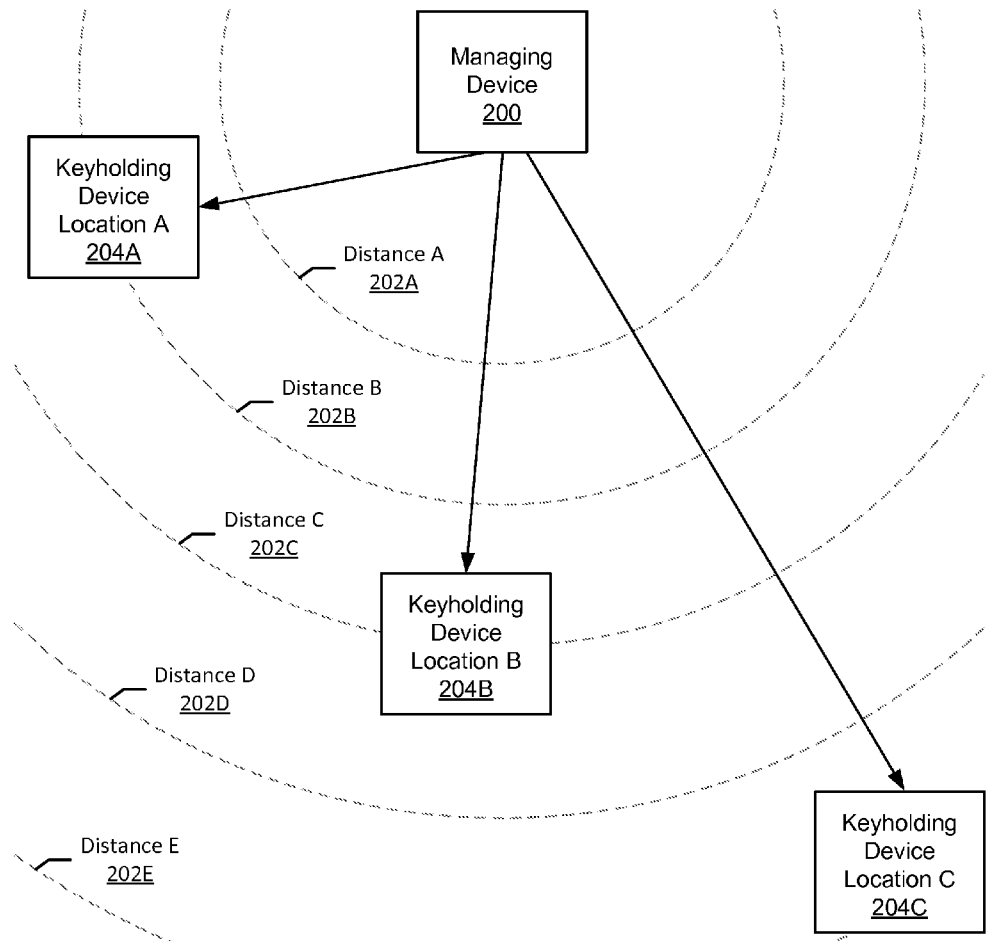
FIG. 2 shows a system in accordance with one or more embodiments of the invention.

FIG. 2 shows a diagram of a managing device and keyholding in accordance with one or more embodiments of the invention. As shown in FIG. 2, managing device (200) is attempting to establish a connection with a keyholding device at keyholding device location A (204A), keyholding device location B (204B), and keyholding device location C (204C). Distances from the managing device (200) in FIG. 2 are represented by distance A (204A), distance B (204B), distance C (204C), distance D (204D), distance E (204E), in order of proximity to managing device (200).

In one or more embodiments of the invention, the ability of the managing device (200) to establish a connection with the keyholding device depends on the physical proximity of the keyholding device to the managing device (200). Specifically, creating an established connection requires the satisfaction of both the protocol proximity requirement and the proximity policies of the data manager and the keyholding process.

For example, assume that managing device (200) is attempting to establish a connection with a keyholding device using a protocol with a protocol proximity requirement of distance D (202D) or less, under certain conditions. Assume also that the keyholding process has a signal strength policy requiring a signal strength that is present only within distance B (202B) to managing device (200). In this example, the keyholding device placed at keyholding device location A (202A) will satisfy both the protocol proximity requirement and the signal strength policy. At location B (202B), only the protocol proximity requirement would be satisfied because the signal would not be strong enough beyond distance B (202B) to satisfy the signal strength policy of the keyholding process. Therefore, the keyholding process at keyholding device location B (202B) would refuse to communicate with the managing device (200). Finally, the protocol host and protocol client would not be able to establish a protocol connection to a keyholding device at keyholding device location C (202C), and so the connection at keyholding device location C (202C) would also fail.

Figure 3:
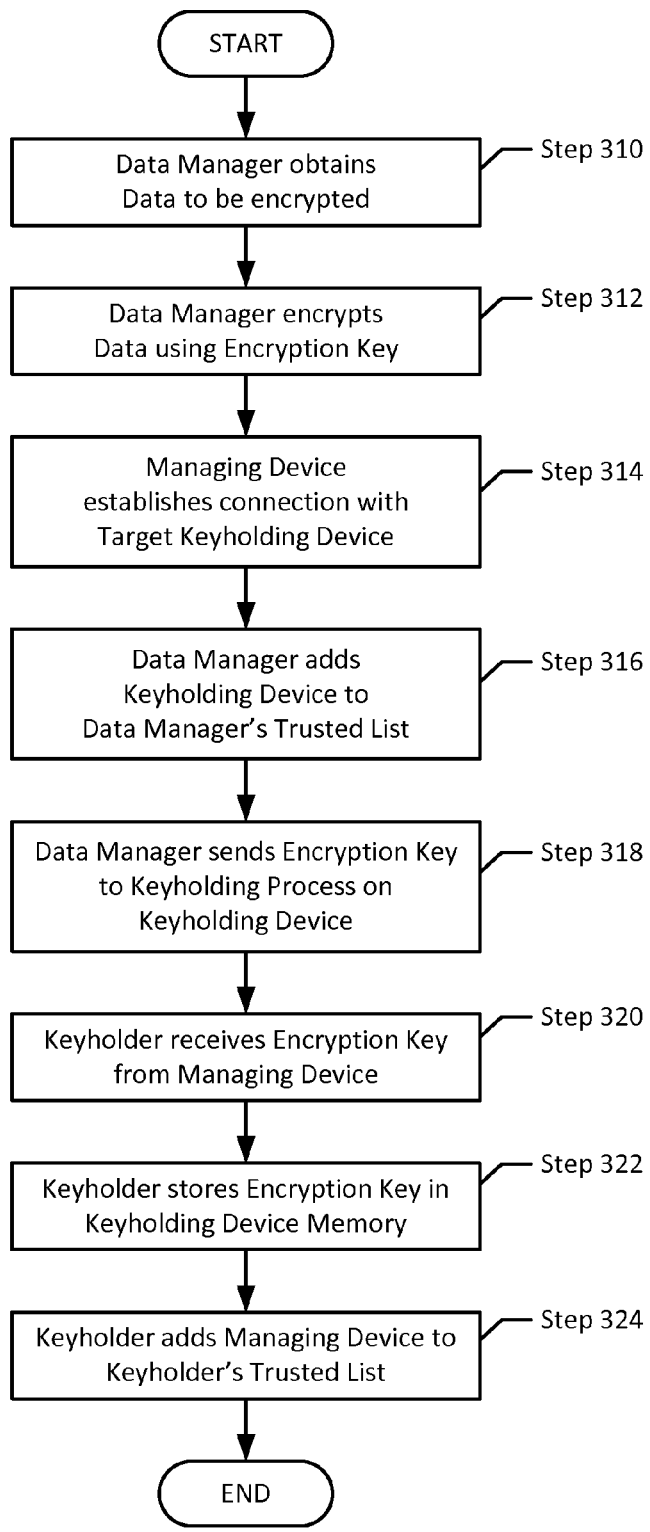
FIG. 3 shows a flow diagram in accordance with one or more embodiments of the invention.

FIG. 3 shows a flowchart for encrypting data in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 310, the data manager obtains the data to be encrypted in accordance with one or more embodiments of the invention. In one embodiment of the invention, the data is a string of text, program, or computer file used to authenticate a user for access to a protected application. In Step 312, the data manager encrypts the data using an encryption key in accordance with one or more embodiments of the invention. In one embodiment of the invention, the encryption key is generated by the data manager. In one embodiment of the invention, the encryption key is a public key obtained by the data manager via a network connection.

In Step 314, the managing device establishes a connection with a target keyholding device in accordance with one or more embodiments of the invention. In one embodiment of the invention, establishing the initiation connection between the managing device and the target keyholding device includes creating a trusted relationship between the devices. The trusted relationship may be created by the communication protocol used by the protocol host and the protocol client. For example, a protocol (such as Bluetooth) may require that the protocol client be "paired" with the protocol host to establish an initial connection. Pairing two devices may be accomplished by generating a pairing code by the protocol host, and confirming that pairing code by transmitting it back to the protocol host from the protocol client. Once the devices are paired together, a trusted relationship is established.

In Step 316, the data manager adds the keyholding device ID of the keyholding device to the managing device trusted list in accordance with one or more embodiments of the invention. In one embodiment of the invention, the managing device trusted list is used in addition to the trusted relationship discussed above. For example, communication between the devices may require the existence of a trusted relationship, and transmission of the encryption key may require that the requesting device is listed within the device's trusted list. In this way, transmission of the encryption key between a protocol host and a protocol client requires both the trusted relationship and the corresponding entry in the device's trusted list.

In Step 318, the data manager sends the encryption key to the keyholding process on the keyholding device in accordance with one or more embodiments of the invention. In one embodiment of the invention, in which the data is encrypted using a public key, the data manager may send an identifier of the public key to the keyholding process. Alternatively, the keyholding process may send a public key or public key identifier to the data manager corresponding to a private key already stored on the keyholding device. In this case, the data will not be encrypted until after the connection has been established and the keyholding process has provided the public key or public key identifier.

In one embodiment of the invention, the encryption key may itself be encrypted using a shared key. The shared key may then be stored on the managing device and a copy may then be transmitted to the keyholding device along with the shared-key-encrypted encryption key. Using a shared-key-encrypted encryption key may insure that only a managing device with the shared key is able to decrypt the shared-key-encrypted encryption key provided by the keyholding device. In one or more embodiments of the invention, using a shared-key-encrypted encryption key creates a trusted relationship between the keyholding device and the managing device.

In one or more embodiments of the invention, the encryption key may be encrypted using a RSA public key private key pair. In one embodiment of the invention, the managing device may generate a public key private key pair, and encrypt the encryption key with the public key (creating a cryptogram that may only be decrypted using the private key). The private key may then be stored on the managing device and the public key (or public key identifier) may then be transmitted to the keyholding device along with the private-key-encrypted encryption key. Using a public-key-encrypted encryption key may insure that only a managing device with the corresponding private key is able to decrypt the public-key-encrypted encryption key provided by the keyholding device. In one or more embodiments of the invention, using a public-key-encrypted encryption key creates a trusted relationship between the keyholding device and the managing device.

In Step 320, the keyholding process receives the key from the data manager in accordance with one or more embodiments of the invention. In Step 322, the keyholding process stores the encryption key in the keyholding device memory in accordance with one or more embodiments of the invention. In Step 324, the keyholding process adds a managing device ID to the keyholding device trusted list in accordance with one or more embodiments of the invention. In one embodiment of the invention, a reference to the copy of the encryption key on the keyholding device is also stored with the managing device ID on the keyholding device trusted list. Also at Step 324, the data manager may be informed that the encryption key has been successfully stored on the keyholding device, and once notified, the data manager may then remove the key from the data manager memory.

As a non-limiting example of the process described in regard to FIG. 3, consider a managing device and a keyholding device attempting to connect using a Bluetooth connection. The first time the protected application is launched after installation onto a mobile device, the protected application generates an RSA public-private key pair and prompts the user to add a second mobile device (keyholding device) to its trusted list. The user may then be presented with a list of devices to which the mobile device may pair (i.e., device advertising themselves over Bluetooth). The user selects one of the devices, and a PIN is generated on one mobile device. The user is then asked to enter the PIN number on the other mobile device in order to successfully pair the two devices. The data manager (first mobile device) obtains the authentication data from the protected application and generates a data encryption key to encrypt the data. The user is also asked to select a second PIN as a passcode for the data encryption key. A key is then derived in a PKCS (Public-Key Cryptography Standards) 5 compliant manner from the PIN, which is then used to encrypt the data encryption key for local storage on the first mobile device. The original copy of data encryption key on the first mobile device is then discarded.

Figure 4:
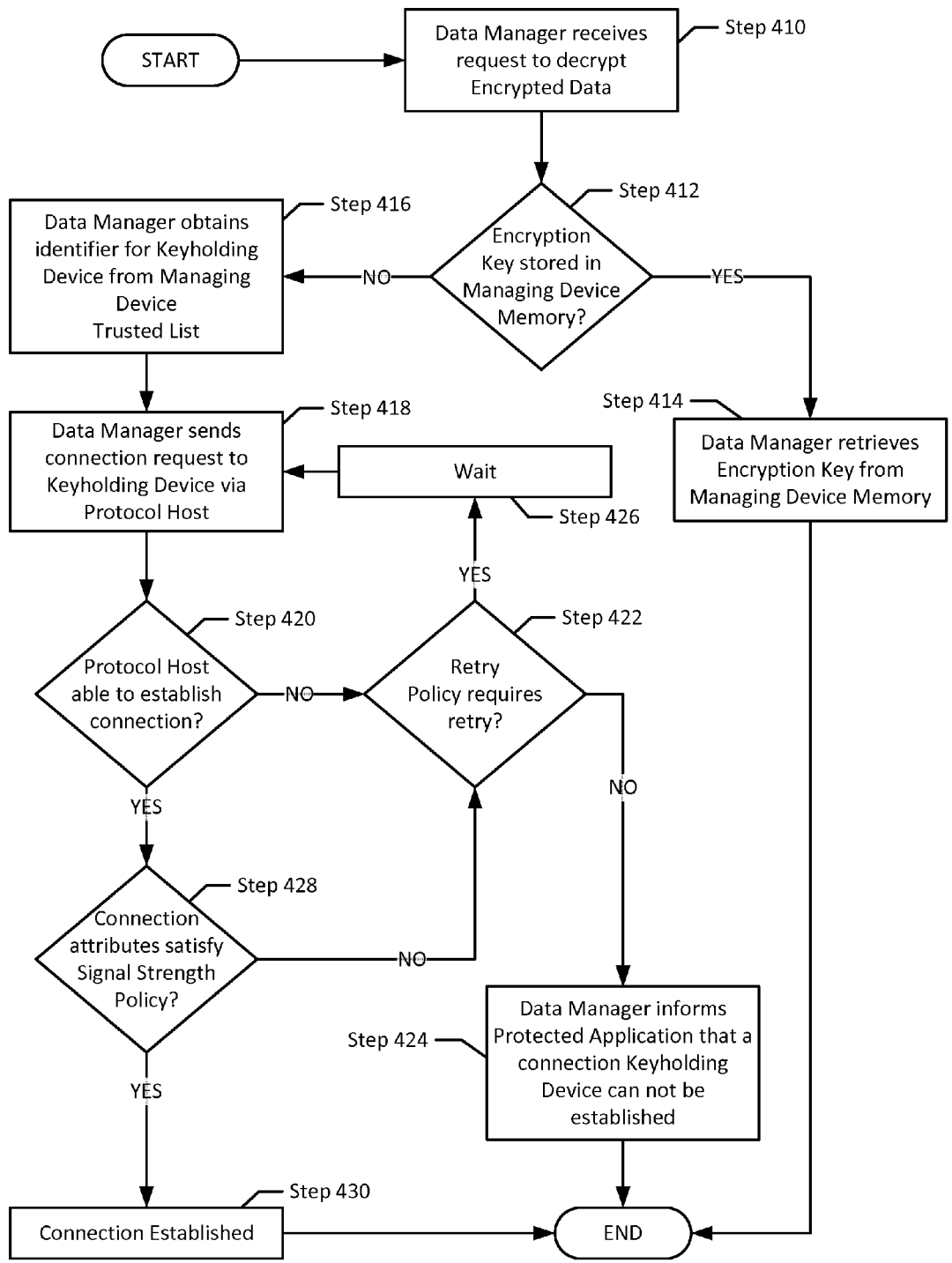
FIG. 4 shows a flow diagram in accordance with one or more embodiments of the invention.

FIG. 4 shows a flowchart for a managing device establishing a connection with a keyholding device in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 410, the data manager receives a request to decrypt the encrypted file in accordance with one or more embodiments of the invention. This request may be sent from a user of the managing device or from a protected application attempting to authenticate the user. In Step 412, the data manager determines whether the encryption key is currently stored in the managing device memory in accordance with one or more embodiments of the invention. In one embodiment of the invention, each time the encryption key is obtained from a keyholding device, the key is stored in the managing device memory for a duration of time before being deleted. This period of time may correspond to the length of the session between the user and the protected application that triggered the key obtaining process. In one embodiment of the invention, the period of time is set according to a security policy.

If in Step 412, the data manager determines that the key is currently stored in the managing device memory, then in Step 414 the data manager retrieves the key from the managing device memory in accordance with one or more embodiments of the invention. If in Step 412, the data manager determines that the key is not currently stored in the managing device memory, then in Step 416, the data manager obtains an identifier for a keyholding device from the managing device trusted list in accordance with one or more embodiments of the invention. In one embodiment of the invention, the user selects a specific keyholding device from a list of keyholding devices in the managing device trusted list.

In Step 418, the data manager sends a connection request to the keyholding device via the protocol host in accordance with one or more embodiments of the invention. If in Step 420, the protocol host is not able to establish a connection, then in Step 422, the data manager and/or the protocol host determines whether the retry policy dictates that an additional attempt to connect is made in accordance with one or more embodiments of the invention. In one embodiment of the invention, the user of the managing device may be presented with a reminder that each device must be turned on, and the necessary applications on each must be running.

If at Step 422, the retry policy dictates that no additional try is to be made, then in Step 424, the data manager informs the protected application that a connection to a keyholding device cannot be established in accordance with one or more embodiments of the invention. If at Step 422, the retry policy dictates that an additional try is to be made, then in Step 426, the data manager waits a period of time before making the additional attempt to establish a connection with a keyholding device in accordance with one or more embodiments of the invention. In one embodiment of the invention, the data manager iterates through the managing device trusted list attempting to establish a connection to each keyholding device listed (if dictated by the retry policy).

If in Step 420, the protocol host is able to establish a connection with a keyholding device, then in Step 428, the data manager determines whether the connection satisfies the signal strength policy in accordance with one or more embodiments of the invention. If at Step 428, the data manager determines that the connection does not satisfy the signal strength policy, then the process returns to Step 422. If at Step 428, the data manager determines that the connection satisfies the signal strength policy, then at Step 430, the data manager creates an established connection in accordance with one or more embodiments of the invention. In one or more embodiments of the invention, the established connection is a Bluetooth connection between two instances of the data manager, where one instance is configured to perform as a keyholding process.

Figure 5:
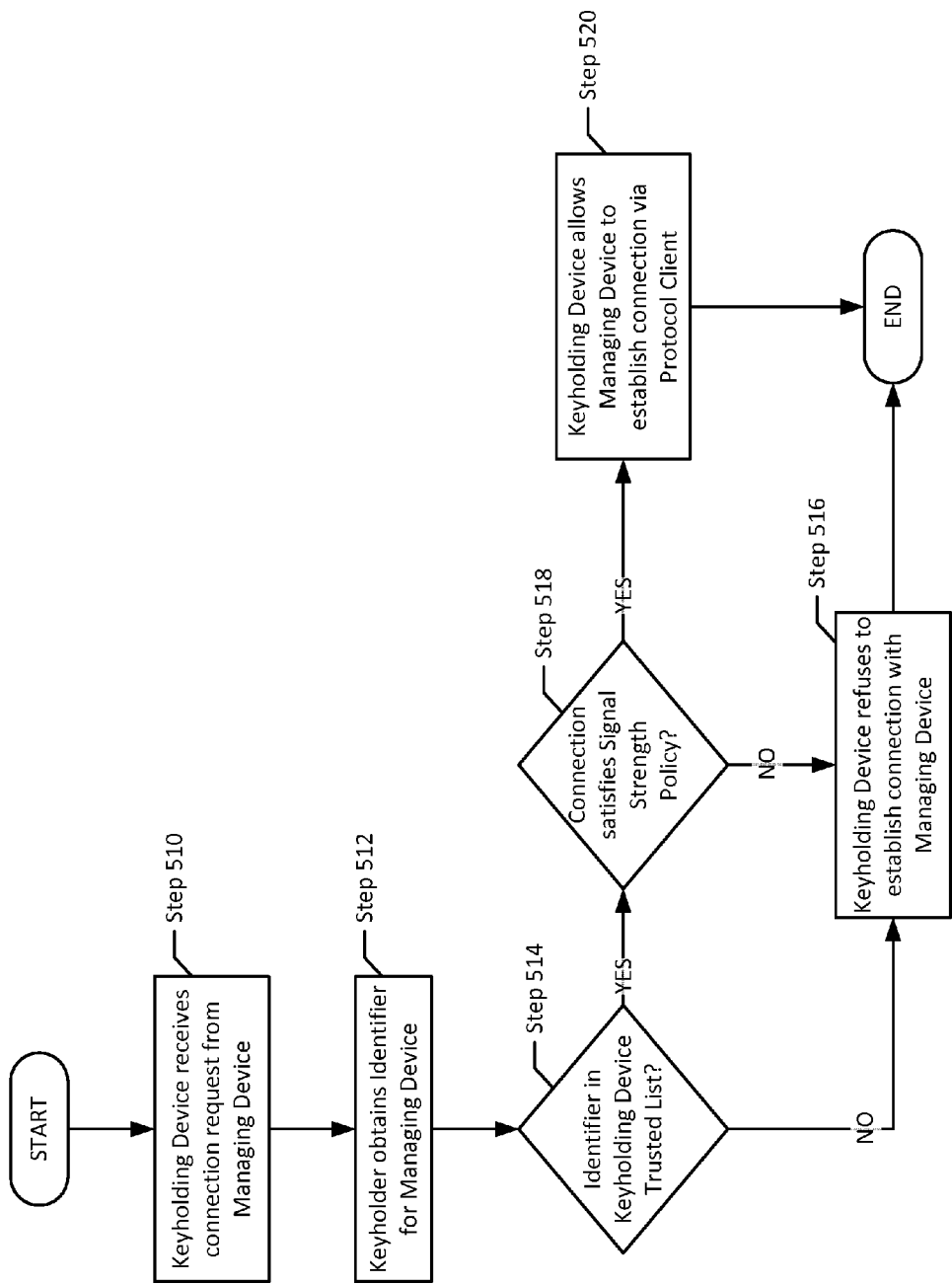
FIG. 5 shows a flow diagram in accordance with one or more embodiments of the invention.

FIG. 5 shows a flowchart for a keyholding device establishing a connection with a managing device in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 510, the keyholding device receives a connection request from a managing device in accordance with one or more embodiments of the invention. In Step 512, the keyholding process obtains a managing device ID for the managing device requesting the connection in accordance with one or more embodiments of the invention. In Step 514, the keyholding process determines whether the managing device ID is in the keyholding device trusted list in accordance with one or more embodiments of the invention. If in Step 514, the keyholding process determines that the managing device ID is not in the keyholding device trusted list, then in Step 516, the keyholding device refuses the connection request from the managing device in accordance with one or more embodiments of the invention. If in Step 514, the keyholding process determines that the managing device ID is in the keyholding device trusted list, then in Step 518, the keyholding process determines whether the signal strength of the connection to the managing device satisfies the signal strength policy of the keyholding process in accordance with one or more embodiments of the invention. In one embodiments of the invention, Step 518 is omitted when the keyholding process does not include a signal strength policy.

If in Step 518, the keyholding process determines that the signal strength of the connection to the managing device does not satisfy the signal strength policy, then in Step 516, the keyholding device refuses the connection request from the managing device in accordance with one or more embodiments of the invention. If in Step 518, the keyholding process determines that the signal strength of the connection to the managing device satisfies the signal strength policy, then in Step 520, the keyholding device allows the managing device to create an established connection with the keyholding device in accordance with one or more embodiments of the invention.

Figure 6:
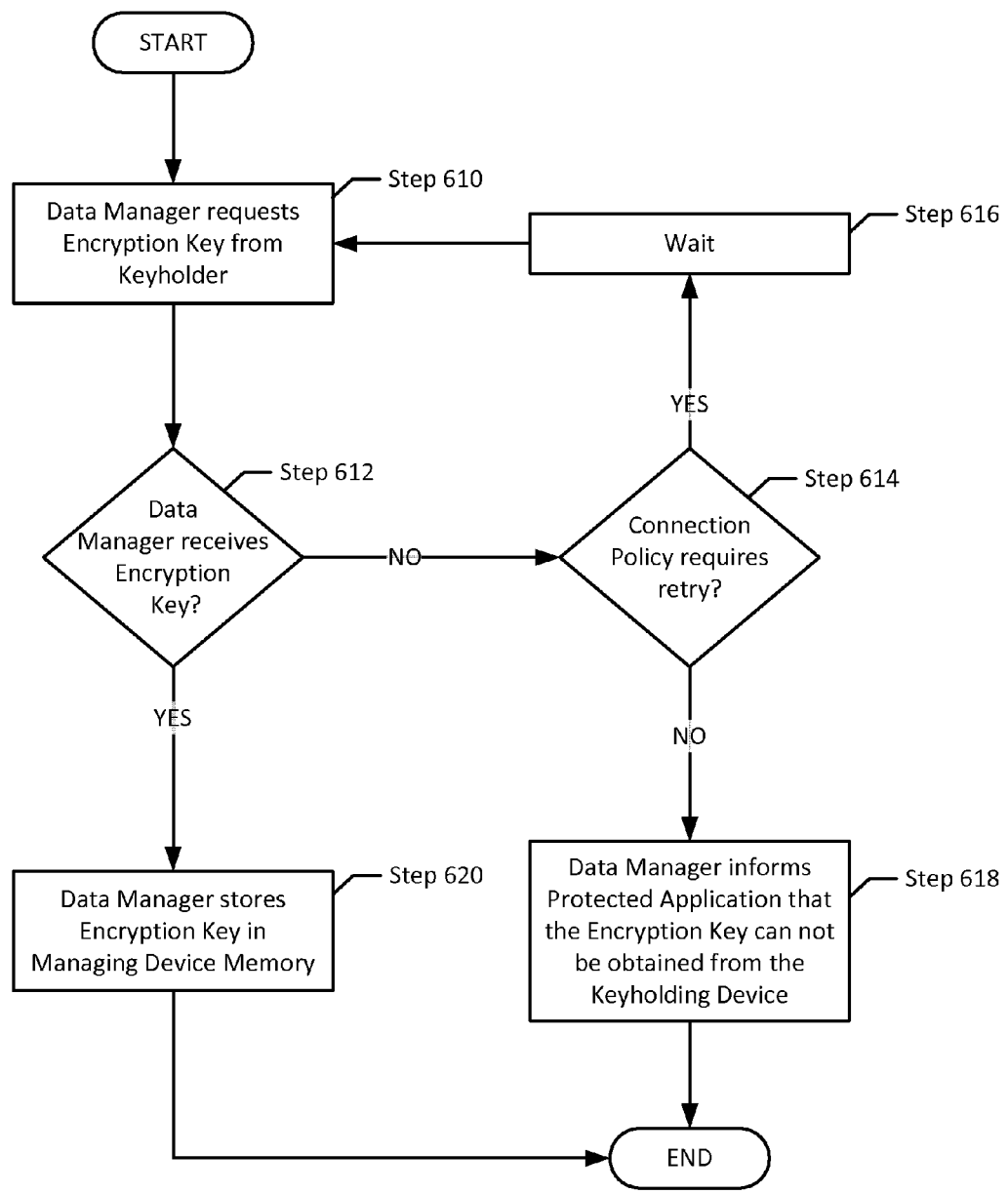
FIG. 6 shows a flow diagram in accordance with one or more embodiments of the invention.

FIG. 6 shows a flowchart for a managing device obtaining an encryption key from a keyholding device in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 610, the data manager requests the encryption key from the keyholding device via the protocol host in accordance with one or more embodiments of the invention. In Step 612, the data manager determines whether the keyholding device has responded by sending the encryption key to the managing device in accordance with one or more embodiments of the invention. If in Step 612, the data manager determines that the key has not been received from the keyholding device, then in Step 614, the data manager determines whether the retry policy dictates that the data manager resend the request for the key in accordance with one or more embodiments of the invention. If in Step 614, the retry policy dictates that the request be resent, then in Step 616, the data manager waits a period of time and resends the request for the key in accordance with one or more embodiments of the invention. If at Step 614, the retry policy dictates that the request not be resent, then in Step 618, the data manager informs the protected application that the encryption key cannot be obtained from the keyholding device in accordance with one or more embodiments of the invention.

If at Step 612, the data manager successfully receives the encryption key, then at Step 620, the data manager stores the received encryption key in the managing device memory in accordance with one or more embodiments of the invention.

In one or more embodiments of the invention, the above process described in FIGS. 4, 5, and 6 may occur transparently to the user of the managing device. For example, the data manager may launch as part of the protected application, and immediately begin scanning for the presence of keyholding devices within communication range. If a keyholding device is found, the device manager tries to establish a connection to it and, if successful, subsequently sends its Bluetooth MAC address as its device id to the connected keyholding device. The keyholding device the device id to find the appropriate cryptogram of the data encryption key and sends that cryptogram back to the managing device.

In one or more embodiments of the invention, the encryption key may be divided and stored on multiple keyholding devices. Such a configuration may require the managing device to complete some or all of the steps discussed in regard to FIG. 3 for each keyholding device used. Thereafter, obtaining the encryption key by the managing device may necessitate that an established connection be created with all keyholding devices or a subset of the keyholding devices. For example, one keyholding device may require verification that the requesting managing device is currently communicating with a second keyholding device. Alternatively, one keyholding device may require that the managing device has communicated with the second keyholding device within a recent period of time. In this way, the use of multiple keyholding devices may necessitate that all required established connections be created within a defined period of time.

Figure 7:
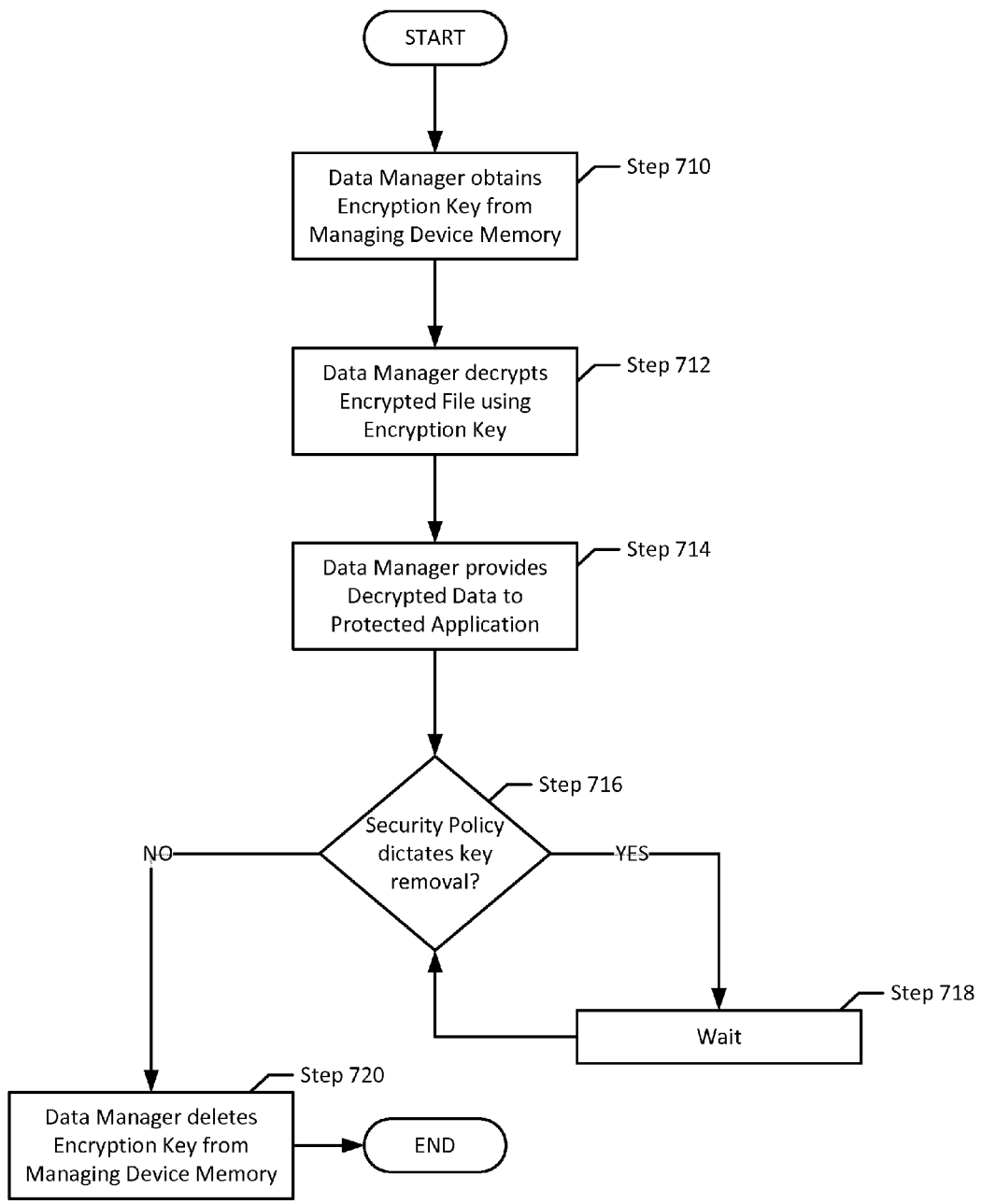
FIG. 7 shows a flow diagram in accordance with one or more embodiments of the invention.

FIG. 7 shows a flowchart for a managing device using an encryption key to decrypt an encrypted file in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 710, the data manager obtains the encryption key from the managing device memory in accordance with one or more embodiments of the invention. In Step 712, the data manager decrypts the encrypted file using the encryption key in accordance with one or more embodiments of the invention. In Step 714, the data manager provides the data from the decrypted file to the protected application in accordance with one or more embodiments of the invention. In Step 716, the data manager determines whether the security policy dictates that the key be removed from the managing device memory in accordance with one or more embodiments of the invention. If in Step 716, the data manager determines that the security policy does not dictate that the key be removed, then at Step 718, the data manager waits to retest the conditions against the security policy in accordance with one or more embodiments of the invention. In one embodiment of the invention, the security policy dictates that the key is to be removed once the protected application is shutdown or logged out of, or when the managing device itself is shut down. If in Step 716, the data manager determines that the security policy dictates that the key be removed, then at Step 720, the data manager removes the encryption key from the managing device memory in accordance with one or more embodiments of the invention.

In one or more embodiments of the invention, the protected application may provide an alternative means for accessing the data in the event that the keyholding device is unavailable or malfunctioning. This may be accomplished by encrypting the encryption key using a key derived from the user's password, and storing the encrypted encryption key on the managing device itself. The encrypted encryption key stored on the managing device may be accessible by a user if the user supplies the corresponding password to the data manager, which then may deriving the key from the provided password and use it to decrypt the encrypted encryption key.

Figure 8:
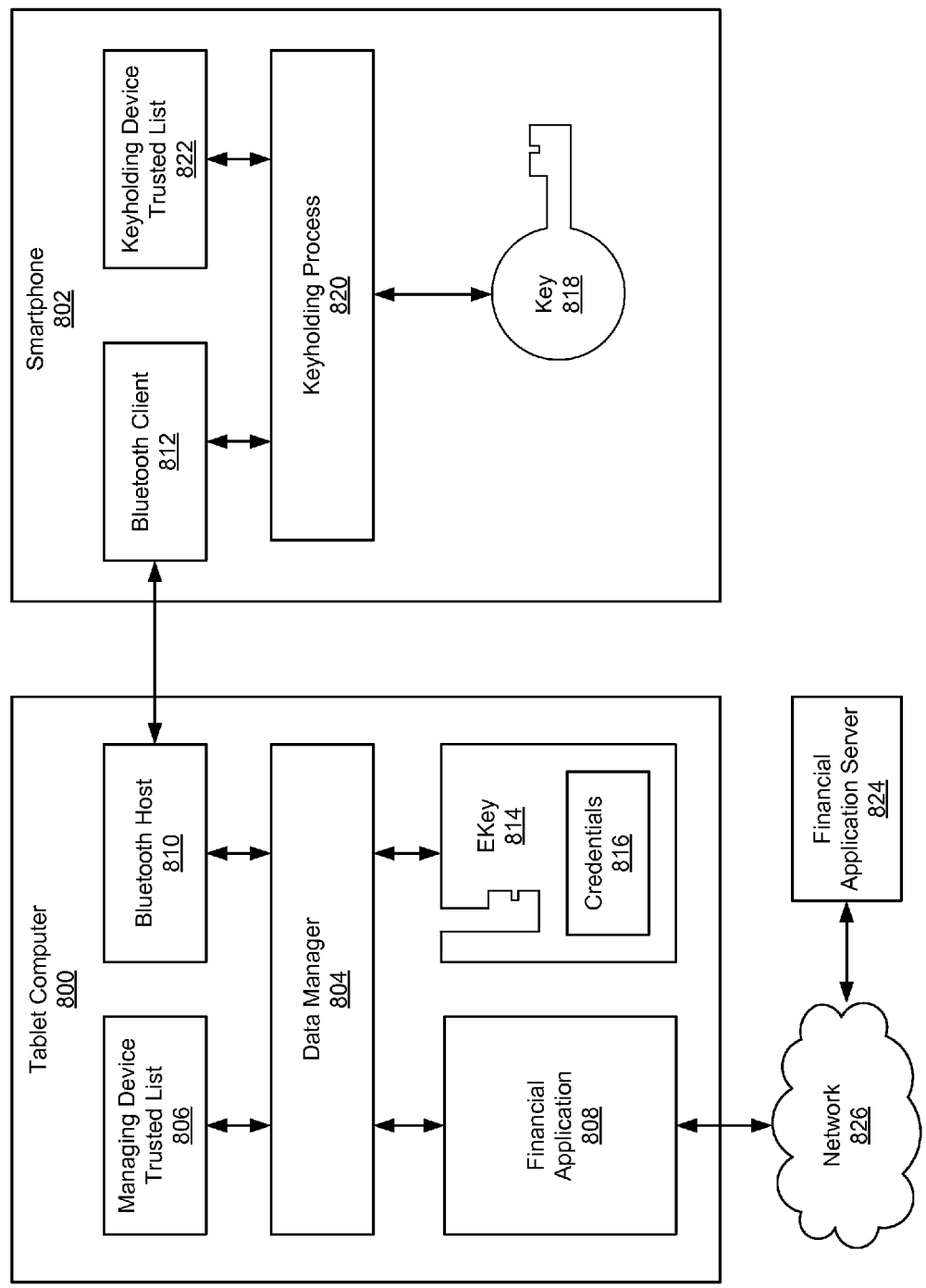
FIGS. 8 and 9 show example systems in accordance with one or more embodiments of the invention.

FIG. 8 shows an example in accordance with one or more embodiments of the invention. The example shown in FIG. 8 is for explanatory purposes only and not intended to limit the scope of the invention. In the example depicted in FIG. 8, a financial application (808) on the tablet computer (800) uses credentials (816) to authenticate a user. Without the credentials (816), a user is not able to access the financial application server (824) over the network (826) using the financial application (808).

Continuing with the exemplary system in FIG. 8, the credentials (816) have been encrypted using key (818), and the key (818) has been transmitted and stored on the smartphone over a previously-established Bluetooth connection between the Bluetooth host (810) and Bluetooth client (812). The smartphone ID has been stored in the managing device trusted list (806), and the tablet device ID has been stored in the keyholding device trusted list (822). The connection between the Tablet (800) and smartphone (802) has been terminated, and the encryption key has been removed from the tablet memory by the data manager (804).

Figure 9:
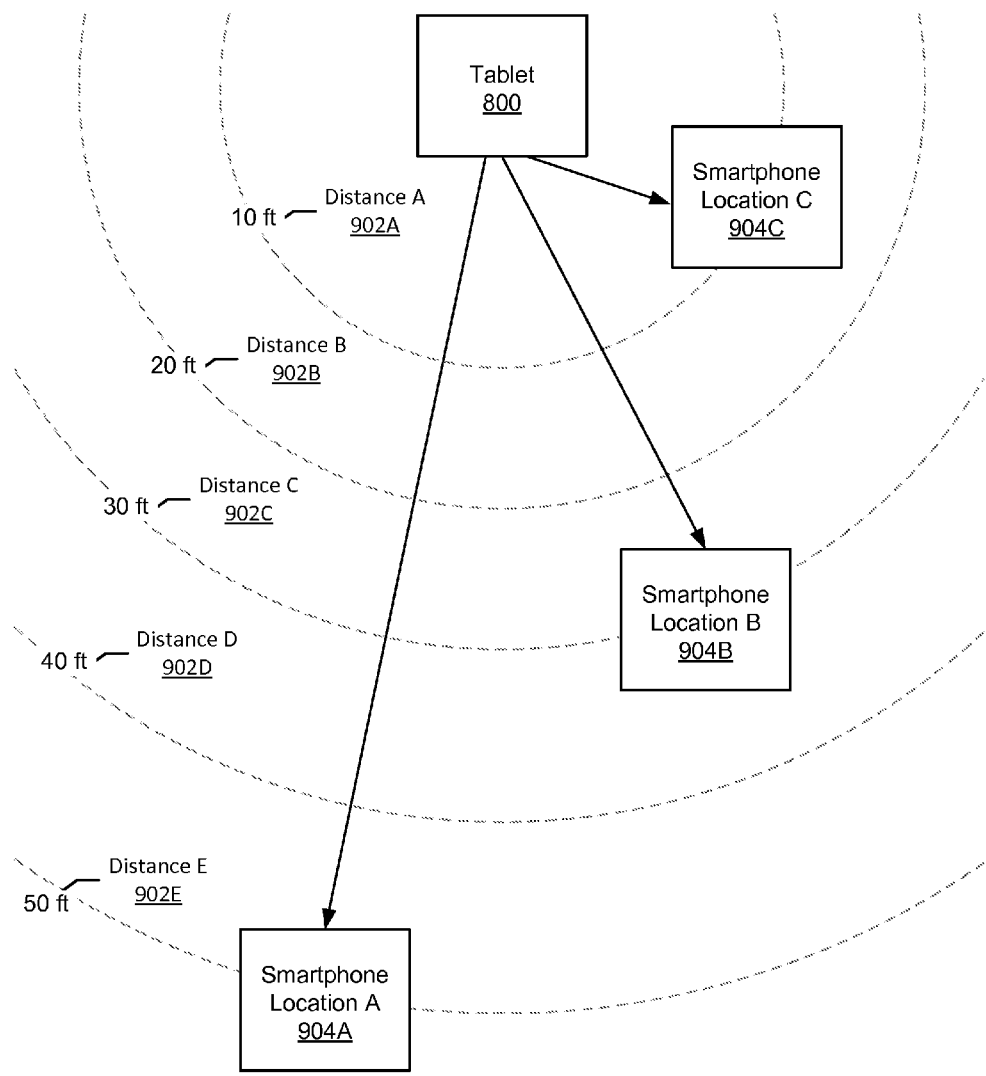

FIG. 9 shows an example in accordance with one or more embodiments of the invention. The example shown in FIG. 9 is for explanatory purposes only and not intended to limit the scope of the invention. In the example depicted in FIG. 8, the Tablet (800) attempts to establish a connection with the smartphone (802) at smartphone location A (904A), smartphone location B (904B), and smartphone location C (904C). Distance A (902A) represents a distance of 10 feet from the Tablet (800). Distance B (902B) represents a distance of 20 feet from the Tablet (800). Distance C (902C) represents a distance of 30 feet from the Tablet (800). Distance D (902D) represents a distance of 40 feet from the Tablet (800). Distance E (902E) represents a distance of 50 feet from the Tablet (800). For the purposes of example FIGS. 8, 9, and 10A-10C, assume that the Bluetooth host (810) and Bluetooth client (812) have a protocol proximity requirement of 40 feet, and the data manager is configured with a signal strength policy that, under the example conditions, requires that the Tablet (800) and smartphone (802) be less than 20 feet apart. Finally, assume that the data manager has been configured with a retry policy that dictates that only a first attempt is to be made before the connection is abandoned.

Figure 10A:
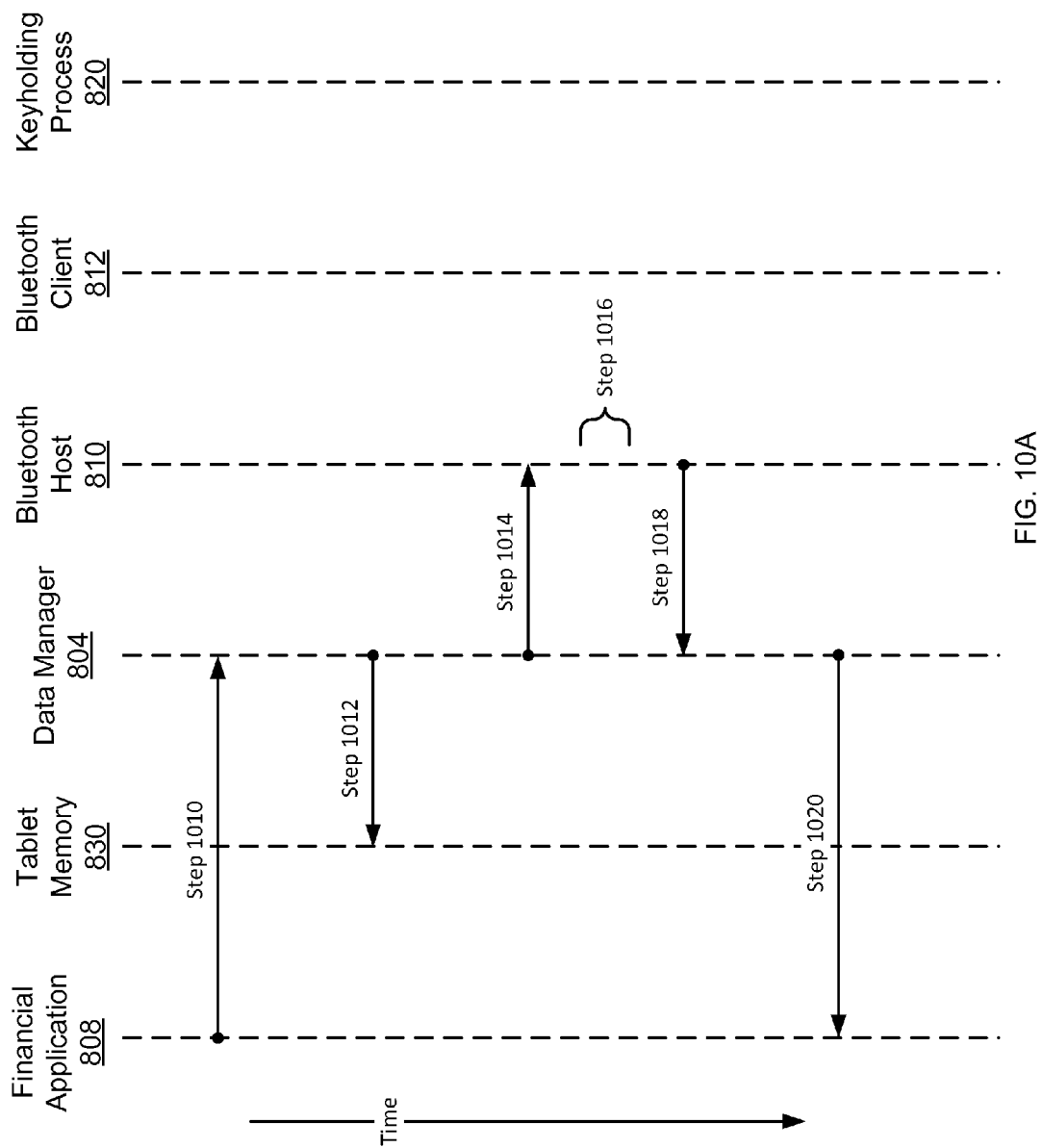

FIG. 10A shows an example timeline in accordance with one or more embodiments of the invention. The example timeline shown in FIG. 10A is for explanatory purposes only and not intended to limit the scope of the invention. The example timeline in FIG. 10A depicts the Tablet (800) attempting to establish a connection with the smartphone (802) and retrieve the key (818). Specifically, the example timeline of FIG. 10A depicts the Tablet (800) attempting to establish a connection with the smartphone (802) at smartphone location A (904A) in FIG. 9.

In Step 1010, the financial application (808) requests credentials (816) from data manager (804). In Step 1012, the data manager (804) determines that the credentials (816) are not currently stored in the tablet memory (830). Also at Step 1012, the data manager obtains the keyholding device ID from the managing device trusted list (806). In Step 1014, the data manager (804) attempts to connect to the keyholding device (802) corresponding to the keyholding device ID, via the Bluetooth host (810).

In Step 1016, the Bluetooth host (810) determines that a connection with the smartphone cannot be initiated. This is because the smartphone (802) is at smartphone location A (904A), beyond the protocol proximity requirements of the Bluetooth host (810). In Step 1018, the Bluetooth host (810) informs the data manager (804) that the connection could not be initiated. In Step 1020, the data manager (804) informs the financial application (808) that the credentials could not be decrypted.

FIG. 10B shows an example timeline in accordance with one or more embodiments of the invention. The example timeline shown in FIG. 10B is for explanatory purposes only and not intended to limit the scope of the invention. The example timeline in FIG. 10B depicts the Tablet (800) attempting to establish a connection with the smartphone (802) and retrieve the key (818). Specifically, the example timeline of FIG. 10B depicts the Tablet (800) attempting to establish a connection with the smartphone (802) at smartphone location B (904B) in FIG. 9.

In Step 1040, the financial application (808) requests credentials (816) from data manager (804). In Step 1042, the data manager (804) determines that the credentials (816) are not currently stored in the tablet memory (830). Also at Step 1042, the data manager obtains the keyholding device ID from the managing device trusted list (806). In Step 1044, the data manager (804) attempts to connect to the keyholding device (802) corresponding to the keyholding device ID, via the Bluetooth host (810).

In Step 1046, Bluetooth host (810) attempts to initiate a connection with the smartphone (802). In Step 1048, the Bluetooth host (810) receives an acknowledgement of the connection request from the Bluetooth client (812). In Step 1050, the Bluetooth host (810) informs the data manager (804) that the connection has been initiated. In Step 1052, data manager (804) determines that the signal between the Bluetooth host (810) and the Bluetooth client (812) does not satisfy the signal strength requirement. This is because the smartphone (802) is at smartphone location B (904B), beyond the point where the signal strength satisfies the signal strength policy. In Step 1054, the data manager (804) informs the financial application (808) that the credentials could not be decrypted.

FIG. 10C shows an example timeline in accordance with one or more embodiments of the invention. The example timeline shown in FIG. 10C is for explanatory purposes only and not intended to limit the scope of the invention. The example timeline in FIG. 10C depicts the Tablet (800) attempting to establish a connection with the smartphone (802) and retrieve the key (818). Specifically, the example timeline of FIG. 10C depicts the Tablet (800) attempting to establish a connection with the smartphone (802) at smartphone location C (904C) in FIG. 9.

In Step 1060, the financial application (808) requests credentials (816) from data manager (804). In Step 1062, the data manager (804) determines that the credentials (816) are not currently stored in the tablet memory (830). Also at Step 1062, the data manager obtains the keyholding device ID from the managing device trusted list (806). In Step 1064, the data manager (804) attempts to connect to the keyholding device (802) corresponding to the keyholding device ID, via the Bluetooth host (810).

In Step 1066, Bluetooth host (810) attempts to initiate a connection with the smartphone (802). In Step 1068, the Bluetooth host (810) receives an acknowledgement of the connection request from the Bluetooth client (812). In Step 1070, the Bluetooth host (810) informs the data manager (804) that the connection has been initiated. In Step 1072, data manager (804) determines that the signal between the Bluetooth host (810) and the Bluetooth client (812) does satisfies the signal strength requirement, and sends a request for the encryption key to the Bluetooth host (810). At Step 1074, the Bluetooth host (810) forwards the request to the Bluetooth client (812) on the keyholding device (802). In Step 1076, the Bluetooth client (812) forwards the request to the keyholding process (820).

At Step 1078, the keyholding process determines that the managing device ID corresponding to the sender of the request is in the keyholding device trusted list (822). At Step 1080, the keyholding process retrieves the encryption key (818) from the keyholding device memory and transmits the key to the managing device (800) via the Bluetooth client (812). At Step 1082, the Bluetooth client (812) forwards the key (818) to the Bluetooth host (810). At Step 1084, the Bluetooth host (810) forwards the key (818) to the data manager (804) on the managing device (800).

In Step 1086, the data manager (804) stores the key (818) in the managing device memory. In Step 1088, the data manager (804) uses the key (818) to decrypt the encrypted file (814) to obtain the credentials (816). In Step 1090, the data manager (804) provides the decrypted credentials (816) to the financial application (808).

Figure 11:
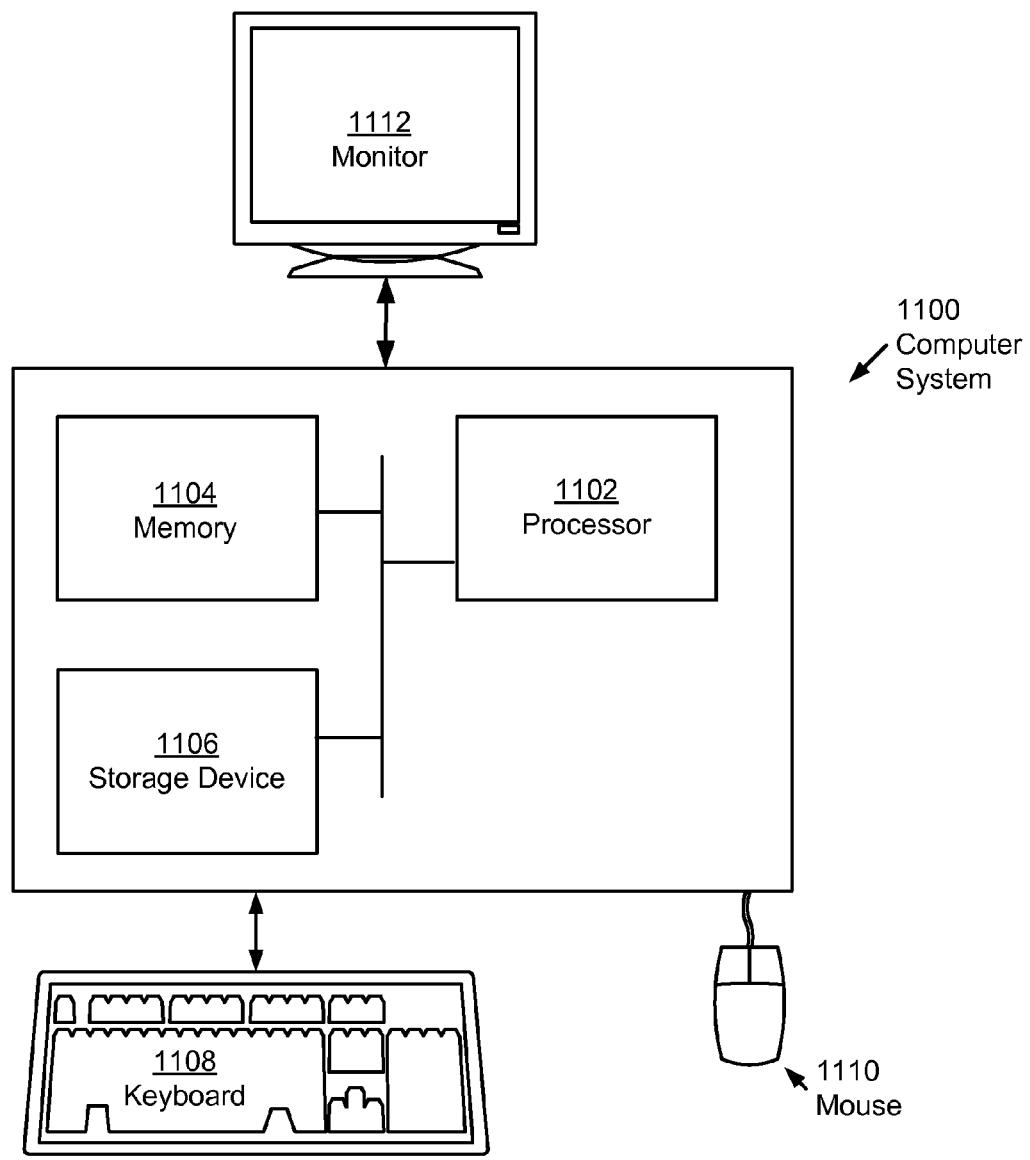
FIG. 11 shows a computer system in accordance with one or more embodiments of the invention.

Embodiments of the invention may be implemented on virtually any type of computer regardless of the platform being used. For example, as shown in FIG. 11, a computer system (1100) includes one or more processor(s) (1102) such as a central processing unit (CPU) or other hardware processor(s), associated memory (1104) (e.g., random access memory (RAM), cache memory, flash memory, etc.), a storage device (1106) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (1102) is hardware. For example, the processor may be an integrated circuit. The computer system (1100) may also include input means, such as a keyboard (1108), a mouse (1110), or a microphone (not shown). Further, the computer system (1100) may include output means, such as a monitor (1112) (e.g., a liquid crystal display (LCD), a plasma display, or cathode ray tube (CRT) monitor). The computer system (1100) may be connected to a network (1114) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1100) includes at least the minimal processing, input, and/or output means necessary to practice embodiments of the invention.

Further, those skilled in the art will appreciate that one or more elements of the aforementioned computer system (1100) may be located at a remote location and connected to the other elements over a network. Further, embodiments of the invention may be implemented on a distributed system having a plurality of nodes, where each portion of the invention (e.g., user agreement information, product use agreement pre-recordings, application store, product use agreement application, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a keyholding device;
   a managing device, communicatively coupled to the keyholding device, comprising:
      a processor;
      a protected application executing on the processor; and
      a memory storing:
         encrypted data encrypted using an encryption key, and
         a trusted device list comprising a keyholding device identifier identifying the keyholding device; and
      a data manager for:
         receiving, from the protected application, a request to decrypt the encrypted data sent over a secure wireless communication protocol, wherein the secure wireless communication protocol requires that a distance between the managing device and the keyholding device be within a specified proximity;
         obtaining the keyholding device identifier from the trusted device list;
         sending a connection request to the keyholding device using the keyholding device identifier;
         creating, based on the distance, an established connection in response to determining that the keyholding device has accepted the connection request;
         requesting, via the established connection, the encryption key from a keyholding process executing on the keyholding device;
         obtaining the encryption key from the keyholding process on the keyholding device;
         decrypting the encrypted data using the encryption key to obtain decrypted data; and
         sending the decrypted data to the protected application.

2. The system of claim 1, wherein sending the connection request comprises initiating a connection between a protocol host on the managing device and a protocol client on the keyholding device.

3. The system of claim 1, wherein creating the established connection comprises determining that the keyholding device is within the specified proximity to the managing device.

4. The system of claim 1, wherein the managing device is one selected from a group consisting of a portable personal computer, a tablet computer, and a smartphone.

5. The system of claim 1, wherein the protected application is a financial application, and wherein the encrypted data is encrypted credentials used to access financial information from the financial application.

6. A method comprising:
   receiving, by a processor on a managing device and from a protected application, a request to decrypt encrypted data, wherein the encrypted data is encrypted using an encryption key sent over a secure wireless communication protocol, and wherein the secure wireless communication protocol requires that a distance between the managing device and the keyholding device be within a specified proximity;
   obtaining, by the processor and from a trusted device list, a keyholding device identifier identifying a keyholding device;
   sending, by the processor, a connection request to the keyholding device using the keyholding device identifier;
   creating, by the processor and based on the distance, an established connection in response to determining that the keyholding device has accepted the connection request;
   requesting, by the processor and via the established connection, the encryption key from a keyholding process executing on the keyholding device;
   obtaining, by the processor, the encryption key from the keyholding process on the keyholding device;
   decrypting, by the processor, the encrypted data using the encryption key to obtain decrypted data; and
   sending, by the processor, the decrypted data to the protected application.

7. The method of claim 6, wherein sending the connection request comprises initiating a connection between a protocol host on the managing device and a protocol client on the keyholding device.

8. The method of claim 6, wherein creating the established connection comprises determining that the keyholding device is within the specified proximity to the managing device.

9. The method of claim 6, wherein the managing device is one selected from a group consisting of a portable personal computer, a tablet computer, and a smartphone.

10. The method of claim 6, wherein the protected application is a financial application, and wherein the encrypted data is encrypted credentials used to access financial information from the financial application.

11. A non-transitory computer readable storage medium comprising instructions that, when executed by a processor of a managing device, perform:
   receiving, from a protected application, a request to decrypt encrypted data, wherein the encrypted data is encrypted using an encryption key sent over a secure wireless communication protocol, and wherein the secure wireless communication protocol requires that a distance between the managing device and the keyholding device be within a specified proximity;
   obtaining, from a trusted device list, a keyholding device identifier identifying a keyholding device;
   sending a connection request to the keyholding device using the keyholding device identifier;
   creating, based on the distance, an established connection in response to determining that the keyholding device has accepted the connection request;
   requesting, via the established connection, the encryption key from a keyholding process executing on the keyholding device;
   obtaining the encryption key from the keyholding process on keyholding device;
   decrypting the encrypted data using encryption key to obtain decrypted data; and
   sending the decrypted data to the protected application.

12. The non-transitory computer readable storage medium of claim 11, wherein sending the connection request comprises initiating a connection between a protocol host on the managing device and a protocol client on the keyholding device.

13. The non-transitory computer readable storage medium of claim 11, wherein creating the established connection comprises determining that the keyholding device is within the specified proximity to the managing device, and wherein the managing device is one selected from a group consisting of a portable personal computer, a tablet computer, and a smartphone.

14. The non-transitory computer readable storage medium of claim 11, wherein the protected application is a financial application, and wherein the encrypted data is encrypted credentials used to access financial information from the financial application.

* * * * *